United States Patent [19]

Krisiloff

[11] Patent Number: 4,681,189

[45] Date of Patent: Jul. 21, 1987

[54] DRY SUMP LUBRICATION SYSTEM FOR AN INTERNAL COMBUSTION ENGINE

[76] Inventor: Steven Krisiloff, 4790 W. 16th St., Indianapolis, Ind. 46224

[21] Appl. No.: 804,673

[22] Filed: Dec. 4, 1985

[51] Int. Cl.⁴ ............................................ F01M 11/08
[52] U.S. Cl. ................... 184/6.13; 184/6.21; 184/6.23; 123/196 A; 55/182; 55/437
[58] Field of Search ............ 184/6.13, 6.21, 6.23; 123/196 A, 196 R, 90.38, 90.33; 55/159, 182, 350, 437, 189

[56] References Cited

U.S. PATENT DOCUMENTS

| | | | |
|---|---|---|---|
| 1,717,096 | 6/1929 | Czarny | 123/196 A |
| 2,024,336 | 12/1935 | Cavanaugh | 184/6.23 |
| 2,268,653 | 1/1942 | Flowers | 184/6.21 |
| 2,373,360 | 4/1945 | Walsh | 184/6.13 |
| 2,432,130 | 12/1947 | Serrell | 184/6.13 |
| 2,443,875 | 6/1948 | Spangenberger | 123/196 A |
| 2,538,983 | 1/1951 | Sharples | 184/6.13 |
| 2,575,315 | 11/1951 | Edwards | 123/196 A |
| 2,581,886 | 1/1952 | Rockwell | 417/211.5 |
| 2,747,514 | 5/1956 | Edwards | 184/6 |
| 2,755,888 | 7/1956 | Cunningham | 184/6.3 |
| 2,888,097 | 5/1959 | Scheffler | 184/6.23 |
| 3,045,778 | 7/1962 | Mosbacher | 184/6.23 |

Primary Examiner—Carlton R. Croyle
Assistant Examiner—Jane E. Obee
Attorney, Agent, or Firm—Jeffers, Hoffman & Niewyk

[57] ABSTRACT

A dry sump lubrication system for an internal combustion engine which includes a cam housing, a crankcase and an oil sump therein. The lubrication system includes an oil tank, a conduit connecting the oil tank to the engine and an oil pump for pumping oil from the sump. The pump may include a plurality of pumping stages. An air separator is directly connected to the pump to remove air from the oil. Oil is conducted from the air separator to the oil tank. Separated air is conducted from the air separator to a canister which is vented to the atmosphere. Oil particles will be condensed out of the air in the canister and will be conducted back to the engine through a conduit which is connected to the engine housing, which conduit includes a restrictor whereby engine pressure will not be equalized with the atmospheric pressure in the canister. A pressure relief is also provided for the oil tank by means of a one way check valve which connects the oil tank to the canister.

12 Claims, 2 Drawing Figures

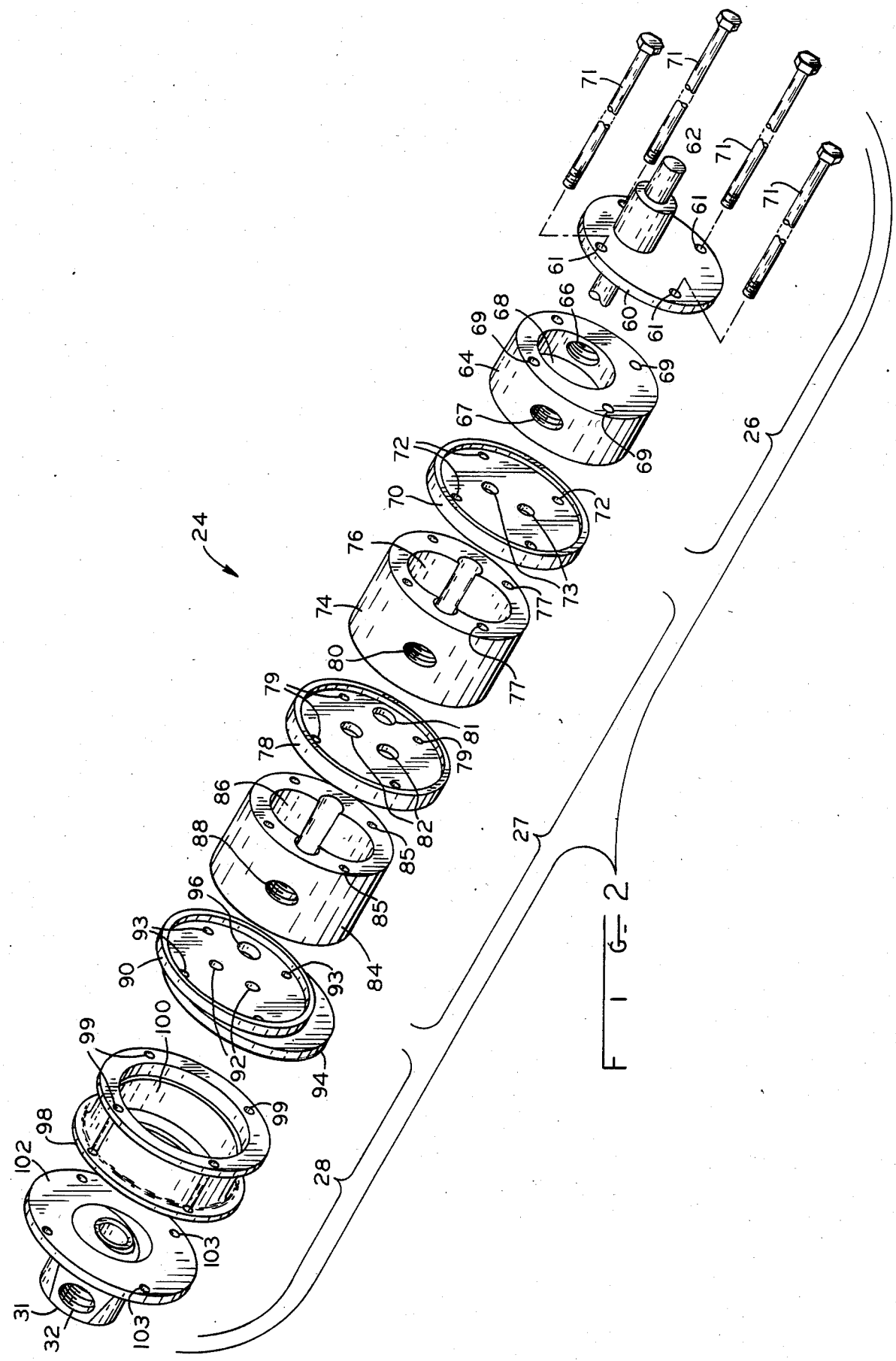

DRY SUMP LUBRICATION SYSTEM FOR AN INTERNAL COMBUSTION ENGINE

BACKGROUND OF THE INVENTION

This invention relates to a lubrication system for an internal combustion engine and more particularly to a dry sump lubrication system including a non-vented oil tank which is located externally of the engine crankcase.

Dry sump lubrication systems are commonly used with high performance engines such as engines used in race cars or aircraft. In such dry sump lubrication systems a supply of lubricating oil is kept in a reservoir or tank which is separate from the sump portion of the crankcase of the engine and which is generally located externally of the engine. During operation of the engine oil is pumped from this tank and is fed directly to the bearings and other parts of the engine which are to be lubricated. The oil which is thrown from the crankshaft and bearings during the operation of the engine is received in a sump located in a lower part of the crankcase from whence the oil is pumped back to the tank by means of a separate pump. However, the lubricating oil which is pumped from the sump contains a large quantity of air, which has been absorbed into the oil due to splashing of the oil during the lubricating process. Furthermore, air is also absorbed into the oil as the oil is pumped from the sump by the scavenger pump. This absorbed air in the lubricating oil results in lowered lubricating efficiency of the oil, thereby causing undesirable heating of the engine and loss of engine efficiency. Furthermore, the lower lubricating efficiency of the oil increases the wear of the engine and therefore lowers the life of the various engine parts.

Various solutions to this problem have been offered by the prior art dry sump lubricating systems. Thus, for instance, in some engines castor oil has been used as a lubricant, since the foaming property of castor oil is superior to that of mineral oil.

Another solution which has been offered is disclosed in U.S. Pat. No. 2,538,983. In this patent a separate deaerator is provided for deaerating the oil after it is pumped from the engine sump by the scavenger pump and before the oil is returned to the engine. The deaerater consists of a cylindrical tank in which the oil is sprayed tangentially against the inside surface of the tank wall. Some of the entrained air is thereby separated from the oil by centrifugal force due to the rotating movement of the oil during passage of the oil along the inside surface of the cylindrical wall from the inlet to the outlet of the deaerator. This type of air separator is relatively inefficient and does not remove sufficient quantities of air. Another problem with this type of air separator is its complexity. It is therefore desired to provide a dry sump lubrication system wherein an effective and simple air separator is provided.

In prior art dry sump lubrication systems the engine and oil tank are generally vented to the atmosphere whereby the engine operates at substantially atmospheric pressure. By operating the engine at atmospheric pressure, increased friction will result in the engine thereby causing lower efficiency of the engine. It is therefore desired to provide a dry sump lubrication system including a non-vented oil tank which communicates with the engine whereby the engine and oil tank are operated at below atmospheric pressure.

U.S. Pat. No. 2,888,097, discloses a dry sump lubrication system for aircraft engine wherein a separate deaerating pump is provided for deaerating the oil as it leaves the scavenger pump. This patent also discloses two stages of scavenger pumps and furthermore discloses a lubricant pump for returning deaerated lubricant to the engine. In this system oil is removed and directly returned to engine 10, while a separate oil tank is used only as an overflow tank. Furthermore, in this lubrication system the air which is separated from the oil is fed to a gear casing which houses the gears for driving the lubricant pump, the deaerating pump, and the scavenger pump. The gear casing is vented to the atmosphere. Since this engine does not appear to be provided with a pressure relief, pressures may build up in the engine which can cause failure of gaskets and burning up of the engine. An additional problem with this structure is that any oil which is entrained in the air entering the gear casing, and which condenses out in the gear casing, will tend to fill up the gear casing and will overflow through the vent out of the engine. This is of course unsatisfactory, particularly in race cars.

It is therefore desired to provide a dry sump lubrication system wherein any oil which condenses out of the separated oil may be returned to the engine, wherein the engine and oil tank are operated at sub-atmospheric pressure and wherein the nonvented oil tank is provided with a pressure relief valve.

SUMMARY OF THE INVENTION

The present invention overcomes the disadvantages of the above described prior art lubrication systems by providing an improved dry sump lubrication system therefor.

The present invention provides a method for lubricating an internal combustion engine having a crankcase, an oil sump in the crankcase, an oil tank in communication with the crankcase, and a vented container. The method comprises pumping oil from the crankcase sump, separating entrained air from the pumped oil and feeding the separated oil to the oil tank from which it is pumped back to the engine. The method furthermore comprises feeding the separated air to the vented container and condensing oil particles out of the separated air. The condensed oil is then returned from the vented container to the engine. Furthermore, the method comprises providing a pressure relief for the oil tank.

One advantage of the method and apparatus of the present invention is that the lubricating oil which is returned to the engine for lubrication thereof is substantially free of entrained air and therefore has greater film strength and better lubricating properties than oil having a quantity of air entrained therein. This removal of air from the lubrication oil and the resultant improvement in the lubrication properties of the oil results in lower frictional losses in the engine and the attendant improved efficiency of the engine. Furthermore, improvement in the lubrication properties of the oil will cause the engine to operate at a lower temperature, thereby also increasing the engine efficiency. Lastly, the improvement in the lubrication properties of the oil will reduce engine wear and therefore will increase the life of the engine.

A further advantage of the invention is that the engine and oil tank will operate at sub-atmospheric pressures since the engine oil tank is non-vented, thereby lowering friction in the engine and improving the operating efficiency of the engine.

A still further advantage of the invention is that, in case a piston burns up in the engine, the possibility of pressure build up in the crankcase and engine blow-up is eliminated by providing a pressure relief valve for the non-vented oil tank.

Still another advantage of the invention is that oil particles entrained in the separated air will be condensed out and returned to the engine.

Yet another advantage of the present invention is the provision of a combined pump and air separator which are driven from a common shaft and which are relatively simple and inexpensive to repair.

The present invention, in one form thereof, comprises a dry sump lubrication system for an internal combustion engine which includes a crankcase. An oil tank is connected to the engine by means of a conduit and an oil pump is connected to the crankcase to pump oil therefrom. An air separator, connected to the pump, separates entrained air from the oil. Oil is conducted from the separator to the oil tank and separated air is conducted from the separator to a container. The container also includes a vent. A one way valve is connected to the oil tank for relieving pressure in the tank while preventing air flow from the atmosphere into the tank.

The present invention, in one form thereof, further provides a dry sump lubrication system for an internal combustion engine which includes a crankcase having an oil sump therein. The lubrication system comprises an oil tank and a first conduit connecting the oil tank to the engine for air flow communication therewith. The oil tank is also connected to the engine by an oil flow conduit. An oil pump which includes a plurality of pumping stages pumps oil from the sump. An air separator is connected to the pump to receive oil therefrom and to separate entrained air from the oil. A second conduit connects the oil outlet of the air separator to the oil tank. A third conduit connects the air outlet of the separator to a container which is vented to the atmosphere. A fourth conduit which includes a restrictor connects the container to the engine. A fifth conduit connects the oil tank to the container. A check valve is connected in the fifth conduit for preventing fluid flow from the container to the oil tank and for enabling fluid flow from the oil tank to the container.

The present invention, in one form thereof, still further provides a method for lubricating an internal combustion engine including a crankcase having an oil sump, an oil tank in communication with the crankcase, a container and a one way valve. The method comprises pumping oil from the crankcase sump, separating entrained air from the pumped oil, conducting the separated oil to the oil tank, conducting the separated air to a container which is vented to the atmosphere, and preventing pressure build-up in the oil tank by providing a one way valve to relieve pressure in the engine and oil tank.

It is an object of the present invention to provide an improved method and apparatus for a dry sump lubrication system for an internal combustion engine.

It is another object of the present invention to provide an improved dry sump lubrication system which utilizes a non-vented oil tank.

Still another object of the present invention is to provide a dry sump lubrication system including a vented container for condensing oil particles out of the air which has been separated from the lubricant oil.

A further object of the present invention is to provide a dry sump lubrication system wherein oil which is condensed out in the separated air container is returned to the engine.

A yet further object of the present invention is to provide a dry sump lubrication system wherein a non-vented oil tank is provided with a pressure relief valve and wherein the engine and oil tank are operated at subatmospheric pressures.

Still a further object of the present invention is to provide a dry sump lubrication system including a combined pump and air separator.

BRIEF DESCRIPTION OF THE DRAWINGS

The above mentioned and other features and objects of this invention, and the manner of obtaining them, will become more apparent and the invention itself will be better understood by reference to the following description of an embodiment of the invention, taken in conjunction with the accompanying drawings drawings, wherein:

FIG. 2 is an exploded view of the combination pump and air separator used in conjunction with the system of FIG. 1.

Corresponding reference characters indicate corresponding parts throughout the several views of the drawings.

Figure 1:
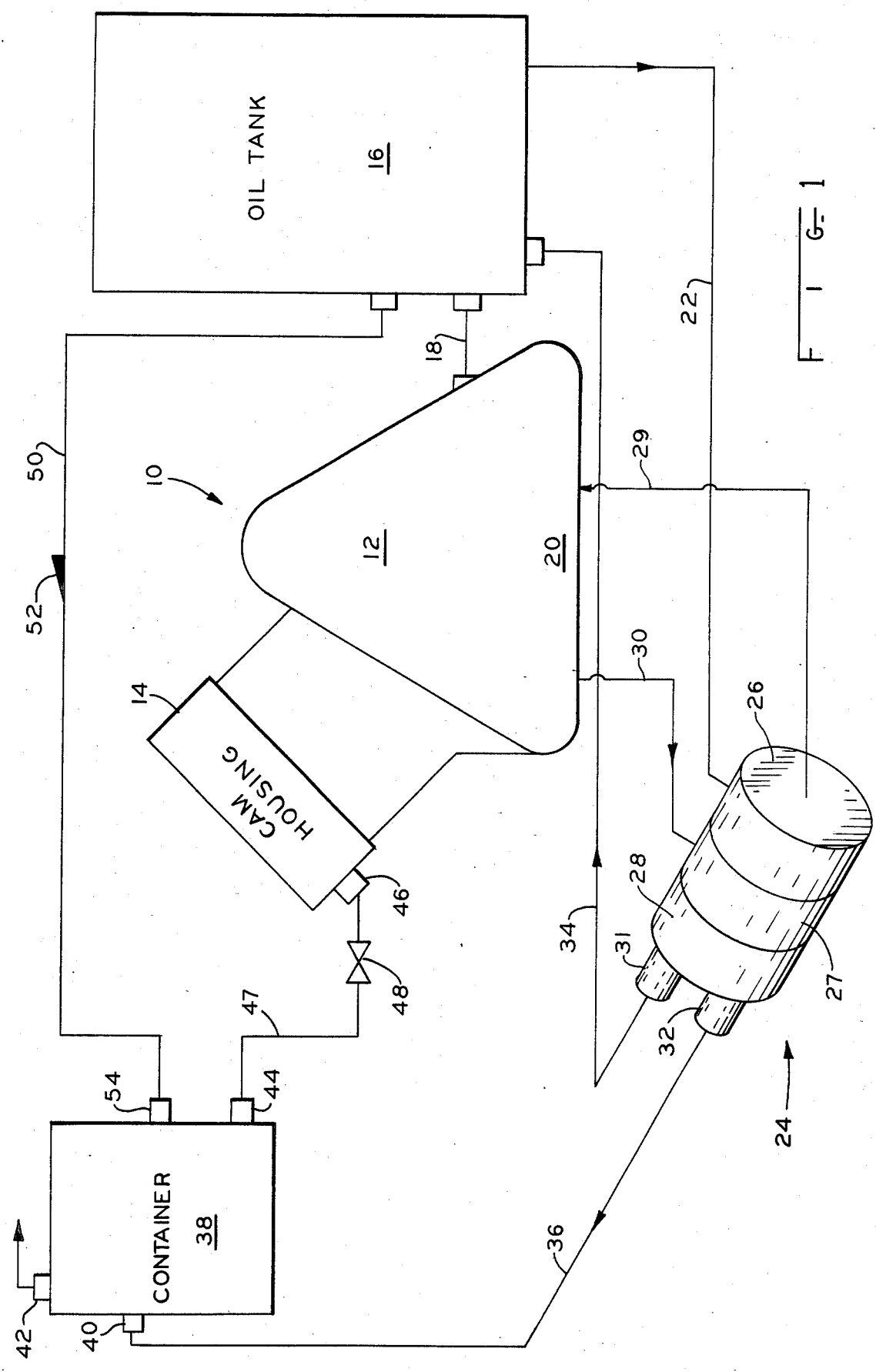
FIG. 1 is a schematic diagram of the dry sump lubrication system according to the present invention.

The exemplifications set out herein illustrate a preferred embodiment of the invention, in one form thereof, and such exemplifications are not to be construed as limiting the scope of the disclosure or the scope of the invention in any manner.

DESCRIPTION OF THE PREFERRED EMBODIMENT

Referring now to FIG. 1, what is disclosed is an engine 10 including a crankcase 12. Crankcase 12 includes a sump 20 in a lower portion thereof. Engine 12 is a high performance engine such as a race engine or an aircraft engine which operates at relatively high RPMs. Engine 10 also includes a cam housing 14 and an oil tank 16 located externally of crankcase 12. Oil tank 16 is relatively small and only needs to have sufficient capacity to contain a quantity of oil to be supplied to crankcase 12 for continuous lubrication of the engine.

Oil tank 16 is connected to crankcase 12 by means of a breather conduit 18 whereby tank 16 and engine 10 operate at the same operating pressure. Tank 16 is connected by a conduit 22 to a pressure pump section 26 of a pump and and air separator assembly 24. Assembly 24 comprises a pressure pump section 26, scavenger pump section 27, and an air separator section 28. Oil is returned to sump 20 from pressure pump 26 by way of conduit 29. Oil, including entrained air, is fed to scavenger pump section 27 by means of conduit 30. Scavenger pump section 27 supplies oil to air separator 28. Air separator 28 is provided with two outlets 31 and 32 for separated oil and air respectively. Outlet 31 receives separated oil from separator 28. Oil flows from outlet 31 through conduit.34 back to oil tank 16.

Separated air flows from separator 28 through outlet 32 and a conduit 36 to an inlet 40 of a canister or container 38. Container 38 is provided with a vent 42 for venting container 38 to the atmosphere. Container 38 is also provided with an oil outlet 44 located near the bottom of container 38 whereby oil, which is condensed out of the separated air in container 38, may be returned to the engine by means of an inlet 46 and a conduit 47. Conduit 47 is also provided with a restriction 48 whereby no appreciable equalization of pressures will occur between engine 10 and vented container 38. Restriction 48 is sufficiently large to cause a small quantity of condensed oil to be continuously drawn out of container 38 into cam housing 14 because of the pressure differential which exists across restriction 48. As further explained hereinafter, engine 10 operates at subatmospheric pressure, whereas container 38 operates at atmospheric pressure, whereby a pressure differential is generated across restriction 48. It should be understood that the connection between container 38 and engine 10 may be made at any convenient location on engine 10. In the illustrated preferred embodiment, the connection is made on cam housing 14. Pressure relief is provided for oil tank 16 by means of a one way check valve 52 which is connected to an inlet 54 of container 38 by a conduit 50.

Referring now to FIG. 2, the pump and air separator assembly 24 is shown in an exploded perspective view. While the housing sections for pressure pump 26, scavenger pump 27, and air separator assembly 28 have been shown, the rotors for the respective sections of the device have not been shown in FIG. 2. The pump and air separator assembly is the subject of a copending patent application Ser. No. 804,671 filed on Dec. 4, 1985 herewith by the applicant of the instant invention and that disclosure is incorporated herein by reference.

Referring further to FIG. 1 and 2, pressure pump section 26 includes an end plate 60 provided with a drive shaft 62. Drive shaft 62 drives all rotating parts for all segments of pressure pump 26, scavenger pump 27, and air separator 28, whereby the rotors of the assembly are driven in unison. A gerotor pump housing 64 is shown including an oil inlet 66 which is connected to conduit 22 to supply oil containing entrained air from oil tank 16 to pressure pump 26. Oil outlet 67 of pump 26 is connected by conduit 29 to engine oil sump 20. Housing 64 is also provided with a cavity 68 within which a gerotor (not shown) revolves. While in the disclosed embodiment a gerotor pump 26 including housing 64 is provided, it should be understood that alternative positive displacement pumps could be substituted therefor. Housing 64 includes four apertures 69 for receiving four suitable fasteners 71 to secure housing 64 to the pump housing sections of scavenger pump 27 and air separator 28. A divider plate 70 is secured to pump housing 64 and includes four apertures 72 through which fasteners 71 project to secure housing 64 and plate 70 to the first scavenger pump section housing 74. Plate 70 also includes twoapertures 73 for receiving the ends of the scavenger rotor shafts (not shown).

Housing 74 includes cavity 76 therein within which the scavenger rotors (not shown) revolve. Housing 74 in turn is secured to divider plate 78 by means of the fasteners 71 which extend through four apertures 77 in housing 74 and four apertures 79 in plate 78. Housing 74 includes aperture 80 through which oil enters scavenger pump housing 74 from oil sump 20 by way of conduit 30. Oil flows from scavenger housing 74 through an aperture 81 in divider plate 78 to the second scavenger stage which includes a housing 84. Divider plate 78 includes two apertures 82 for receiving the shafts of the scavenger rotors (not shown). Second scavenger stage housing 84 includes a cavity 86 therein within which the rotors of the second scavenger stage revolve. Housing 84 also includes four apertures 85 for receiving fasteners 71 for securing housing 84 in assembly 24. Housing 84 also includes oil inlet aperture 88 for receiving oil from oil sump 20 via oil conduit 30.

Divider plate 90 includes two apertures 92 for receiving the rotor shafts (not shown) of the scavenger rotors (not shown). Plate 90 is connected to the air separator section 28 and housing 84 by fasteners 71 which extend through four apertures 93. Oil exits scavenger housing 84 through aperture 96 in plate 90. Air separator 28 includes a separator plate 94 secured to divider plate 86 and to a separator housing 98. Housing 98 includes a cavity 100 within which the separator rotor (not shown) revolves. Separator housing 98 is secured to divider plate 90 and a separator end plate 102 by means of fasteners 71 which extend through apertures 93, 99, and 103. Separator end plate 102 includes an oil outlet 31 and air outlet 32. All of the sections of the pump and separator assembly 24 are thus secured together by means of the four bolts 71 which are received in apertures 61, 69, 72, 77, 79, 85, 93, 99, and 103 located in each of the respective aligned housing sections, divider plates, and end plates. Accordingly it is relatively simple to repair the pump and separator assembly 24 by merely loosening bolts 71 and repairing the particular section which is malfunctioning. Bolts 71 may either be threaded into apertures 103 of plate 102 or may receive nuts (not shown) on the threaded ends thereof.

In operation, and by referring to FIGS. 1 and 2, the lubrication system functions as follows. Oil containing entrained air is continuously pumped from sump 20 through conduit 30 by means of scavenger pump 27 including two scavenger stages having housings 74 and 84. While, in the preferred embodiment, two scavenger pump stages have been shown, it should be understood that additional scavenger stages could be added. For purposes of the preferred embodiment it has been found that two stages are sufficient. Typically the scavenger stages can pull approximately 10 inches of vacuum, thereby providing a relatively constant sub- atmospheric pressure in the engine. However, if more vacuum were desired, additional scavenger stages could be added. Conversely, if less vacuum were desired, one scavenger stage could be provided.

The oil, after being pumped from the last scavenger stage housing 84, will enter air separator housing 98 through aperture 96 in divider plate 90. Separator 28 operates on the centrifugal principle. The heavier oil is spun to the outside of housing 98 whereas the lighter air will remain at the center of housing 98. The oil will be returned back to oil tank 16 through oil outlet 31 and conduit 34 after which the oil be will circulated through engine 10 by means of pressure pump 26 and conduits 22 and 29. The separated air will be fed to container 38 by way of separator air outlet 32 and conduit 36 so that any oil particles which are entrained in this separated air may be condensed out in container 38 and returned to engine 10 by means of conduit 47. The remaining air entering container 38 is vented to the atmosphere by means of vent 42. Since engine 10 normally operates at subatmospheric pressures, oil will flow from container 38 to cam housing 14 due to the pressure differential across restriction 48. Restriction 48, which may comprise any suitable restrictor such as a valve or a capillary tube, insures that the vacuum generated in engine 10 by pump assembly 24 will be maintained and will not be lost by way of the connection of conduit 47 with cam housing 14 to vented container 38.

The one way pressure relief check valve 52 for oil tank 16 provides a further safety feature for the engine lubrication system. If a piston should burn in engine 10 or if some other occasion should arise whereby the pressure in engine 10 rises, this pressure will be relieved by way of the connection of conduit 18 to oil tank 16 which is at substantially the same pressure as engine 10. This high pressure will be relieved from tank 16 by way of conduit 50 and one way check valve 52 to container 38. Check valve 52 will not permit pressure equalization between oil tank 16 and the atmosphere but permits only one way fluid flow from oil tank 16 to container 38 to relieve fluid pressure in tank 16 in excess of atmospheric pressure. Tank 16 may also be vented directly to the atmosphere by way of check valve 52 rather than returning line 50 to container 38. Subatmospheric pressures will be maintained in engine 10 and tank 16 as valve 52 will be closed to reverse fluid flow.

While this invention has been described as having a preferred design it will be understood that it is capable of further modification. This application is therefore intended to cover any variations, uses, or adaptations, of the invention following the general principles thereof and including such departures from the present disclosure as come within known or customary practice in the art to which this invention pertains and fall within the limits of the appended claims.

What is claimed is:

1. A method for lubricating an internal combustion engine having a crankcase including an oil sump, an oil tank in fluid flow communication with said crankcase, a container, and a one way valve, the method comprising:
    equalizing the pressure between the engine and the sump
    pumping oil from said crankcase sump;
    separating entrained air from said pumped oil;
    conducting said oil, from which air has been separated, to said oil tank;
    conducting said separated air to said container and separating entrained oil particles from said separated air;
    venting said container to the atmosphere; and
    preventing pressure buildup in said oil tank and engine by providing a one way valve for relieving pressure in said engine and oil tank.

2. The method of claim 1 including the step of connecting said container to said engine by means of a restricted conduit, whereby the oil particles condensed from said separated air and collected in said container are conducted to said engine.

3. The method of claim 1 wherein said oil tank is vented to the atmosphere for relieving superatmospheric pressure in said oil tank and engine by connecting said oil tank to said container by way of a conduit, said one way valve being connected in said conduit between said oil tank and container.

4. A dry sump lubrication system for an internal combustion engine, said engine having a crankcase, the lubrication system comprising:
    an oil tank connected to said engine by a pressure equalizing conduit means;
    scavenging oil pump means connected to said crankcase to pump oil therefrom;
    air separating means for separating entrained air from oil pumped from the engine by said scavenging pump means and connected to said scavenging pump means to receive oil therefrom;
    mean for conducting oil from said separating means to said oil tank;
    container means connected to said separator means for receiving said separated air therefrom and for separating oil particles from said air;
    venting means for venting said container to the atmosphere;
    oil circulating pump means connected to said oil tank and said crankcase for delivering oil from said oil tank to said engine for lubrication said engine; and
    one way valve means for connecting said oil tank to a source of atmospheric pressure for relieving super atmospheric pressure in said engine and oil tank while permitting operation of said engine at subatmospheric pressures.

5. The lubrication system of claim 4 wherein said one way valve is connected to said container means.

6. The lubrication system of claim 1 including conduit means for conducting oil from said container means to said engine, said conduit means including restriction means to prevent pressure equalization between said engine and said container means.

7. The lubrication system of claim 4 wherein said scavenging pumping means, said air separator means and said oil circulating pump means are driven from a common driving means.

8. The lubrication system of claim 4 wherein said scavenging pumping means includes a plurality of scavenging pump stages, said air separator and said scavenging pumping stages comprising separable sections of a unitary assembly which are secured together by fastening means and driven by a common driveshaft.

9. The lubrication system of claim 4 wherein said scavenging oil pump means, said air separator and said oil circulating pump means comprise separable sections of a unitary assembly and which are driven from a common driveshaft.

10. A dry sump lubrication system for an internal combustion engine, said engine having a crankcase, and an oil sump in said crankcase, the lubrication system comprising:
    an oil tank;
    a first pressure equalizing conduit connecting said oil tank to said engine
    an oil circulating conduit connecting said oil tank to said engine for oil circulating communication therewith;
    an oil circulating pump in said oil circulating conduit for receiving oil from said oil tank and for delivering said oil to said engine;
    oil scavenging pumping means for pumping oil from said sump, said oil scavenging pumping means comprising a plurality of pumping stages;
    centrifugal air separating means connected to said scavening pumping means for receiving oil therefrom and for separating entrained air from said oil;
    a second conduit connecting an oil outlet of said centrifugal air separator means to said oil tank;
    a second separating means comprising a container for separating oil particles from air received from said centrifugal air separating means;
    a third conduit for connecting the air outlet of said centrifugal air separator means to said container;
    a vent for venting said container to the atmosphere;
    a fourth conduit for connecting said container to said engine;
    a restrictor in said fourth conduit;

a fifth conduit for connecting said oil tank to said containers; and a check valve in said fifth conduit for preventing fluid flow from said container to said oil tank and for enabling fluid flow from said oil tank to said container for relieving superatmospheric pressures in said oil tank and engine.

11. The lubrication system of claim 10 wherein said oil scavenging pumping means and said air separator means are driven from a common driving means.

12. The lubrication system of claim 10 wherein said scavenging pumping means includes a plurality of scavenging pumps, said air separator and scavenging pumping means, comprising separable sections of a unitary assembly secured together by fastening means and driven by a common driveshaft.

* * * * *

UNITED STATES PATENT AND TRADEMARK OFFICE
CERTIFICATE OF CORRECTION

PATENT NO. : 4,681,189
DATED : July 21, 1987
INVENTOR(S) : Steven Krisiloff

It is certified that error appears in the above-identified patent and that said Letters Patent is hereby corrected as shown below:

Claim 4, Col. 8, line 10, change "lubrication" to
--lubricating--.

Signed and Sealed this

Twenty-second Day of December, 1987

Attest:

DONALD J. QUIGG

Attesting Officer

Commissioner of Patents and Trademarks